May 5, 1936.  W. B. EBELING  2,039,783

SANITARY CABINET FOR HOUSE PETS

Filed Oct. 25, 1934   3 Sheets-Sheet 1

INVENTOR
William B. Ebeling
BY
ATTORNEYS

May 5, 1936. W. B. EBELING 2,039,783
SANITARY CABINET FOR HOUSE PETS
Filed Oct. 25, 1934  3 Sheets-Sheet 3
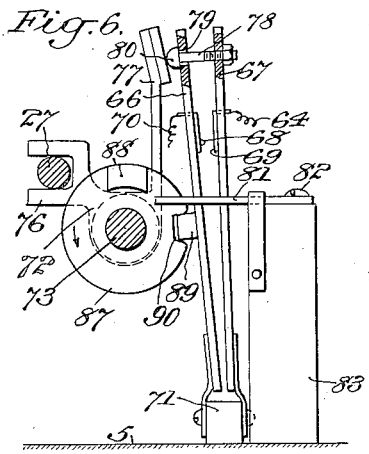
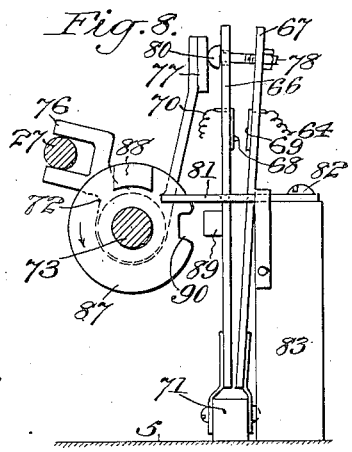
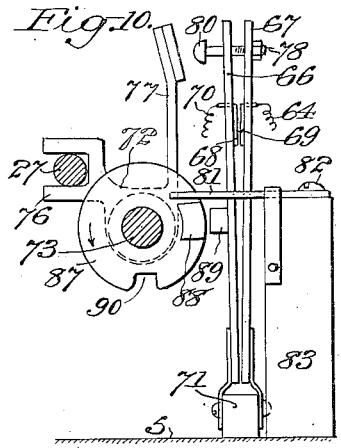
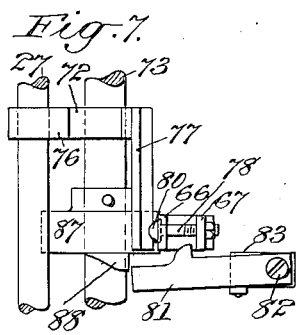
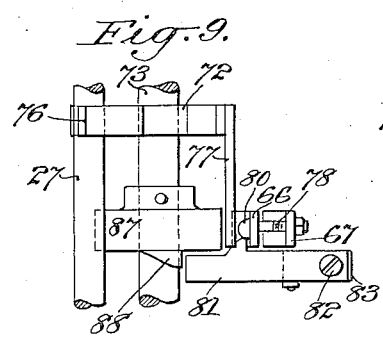
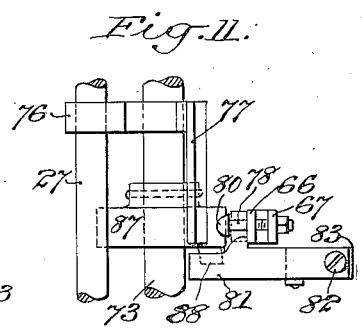
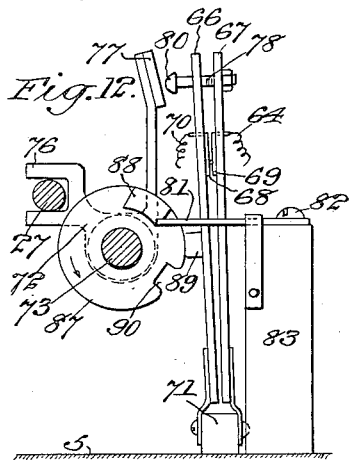
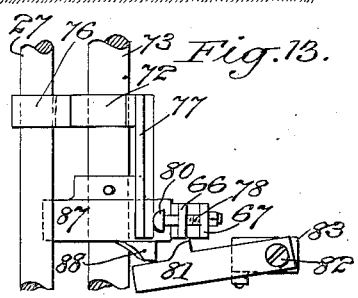
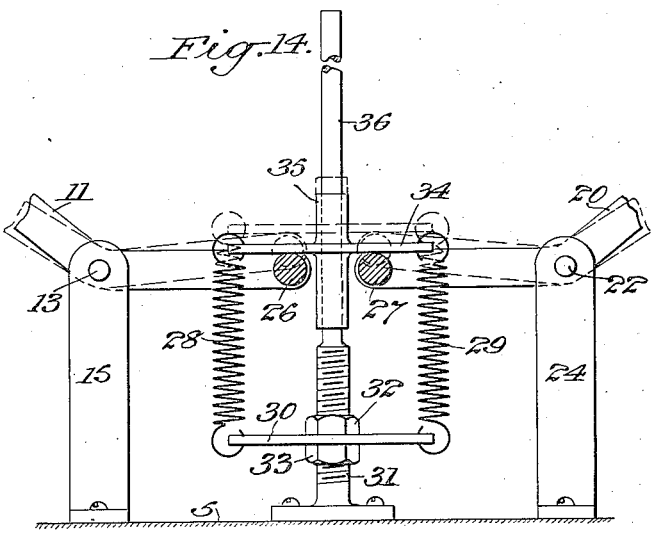

Patented May 5, 1936

2,039,783

UNITED STATES PATENT OFFICE 2,039,783

SANITARY CABINET FOR HOUSE PETS

William B. Ebeling, Brooklyn, N. Y.

Application October 25, 1934, Serial No. 749,882

26 Claims. (Cl. 119—15)

This invention relates to sanitary cabinets for house pets, such as dogs, cats, or the like and has for its object to provide a cabinet which is confined within certain limits to permit a house pet to relieve itself at inclination, and thereby avoid all dirt and nuisance.

Another object is to provide a cabinet having the floor covering of absorbent material such as paper, or the like, which covering is shifted to present a new surface after the pet has left the cabinet.

Another object is to provide certain improvements in the form, construction and arrangement of the several parts whereby the above named and other objects may effectively be attained.

A practical embodiment of my invention is represented in the accompanying drawings, in which Fig. 1 represents a front elevation of my sanitary cabinet, a portion being broken away to illustrate certain portions within;

Fig. 6 represents a detail vertical section, on a still larger scale, of a portion of the structure shown in Fig. 5;

Fig. 7 represents a plan view of the same;

Figure 1:
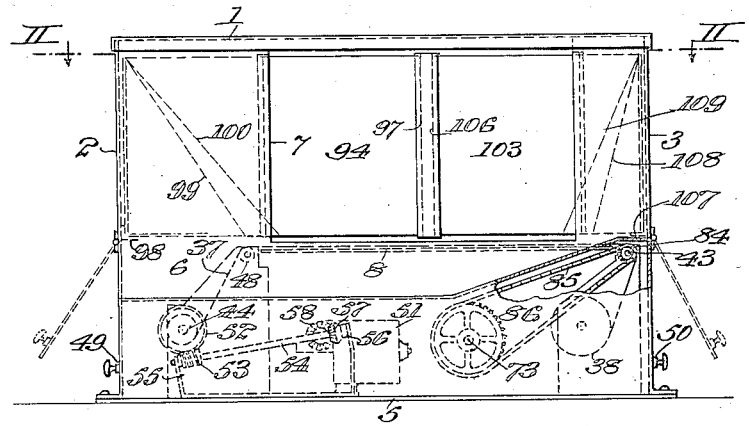
Figure 2:
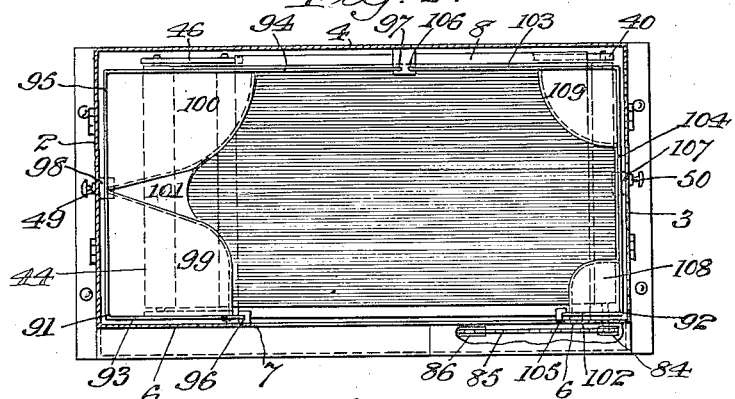
Fig. 2 represents a horizontal section taken in the plane of the line II—II of Fig. 1 looking in the direction of the arrows, a portion of the cabinet being removed.
Figure 3:
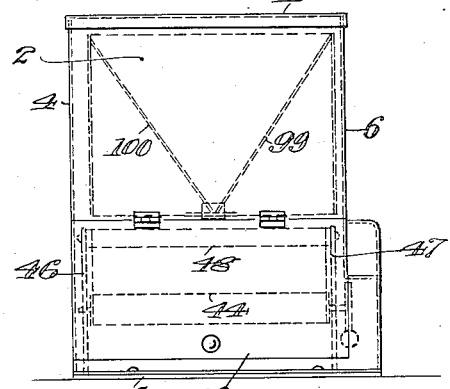
Fig. 3 represents an end elevation of the same.
Figure 4:
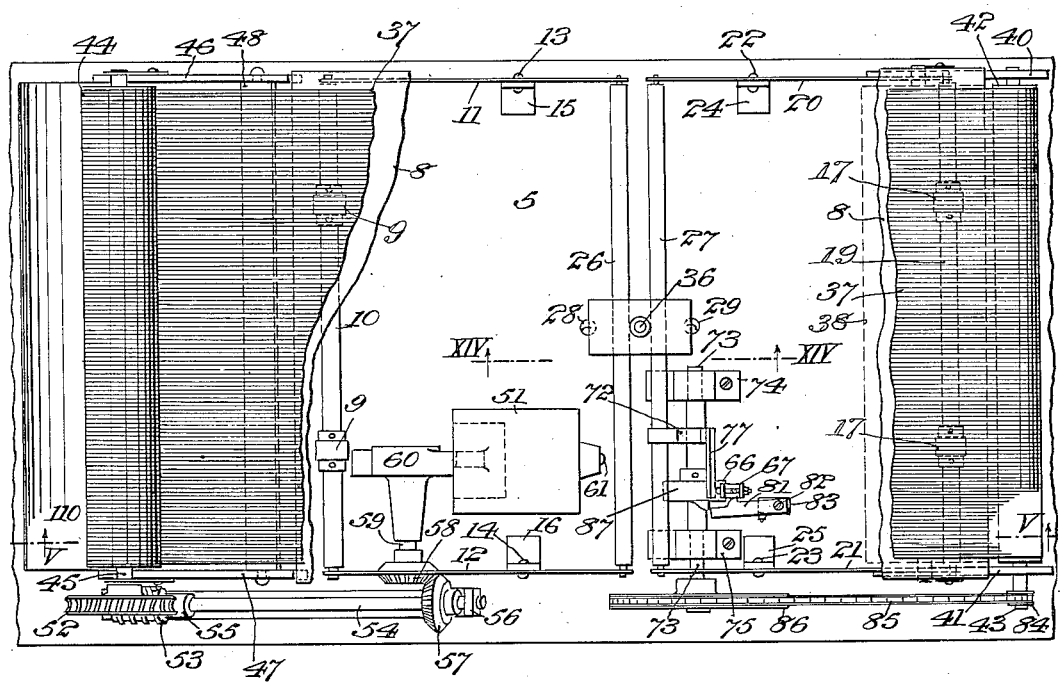
Fig. 4 represents a detail plan view, on a larger scale, of the actuating mechanism, a portion of the web and platform being broken away to show parts below.

Figs. 8 to 13 inclusive represent views similar to that shown in Figs. 6 and 7 with parts in other positions; and Fig. 14 represents a detail vertical section, on a larger scale, taken in the plane of the line XIV—XIV of Fig. 4 looking in the direction of the arrows, of the mounting of the platform supporting arms and adjacent mechanism.

The cabinet is preferably formed of a substantially rectangular box-like structure having a removable top denoted by 1, vertical side walls by 2, 3, a back wall by 4, a base by 5, and a front wall by 6 which has an opening 7 therein to serve as an entrance to and an exit from the cabinet.

A platform 8 is disposed within the cabinet, and has one end arranged to rest on a plurality of rollers 9 mounted on a rod 10 carried between the outer ends of rocking levers 11, 12 which are pivoted at 13, 14 respectively to brackets 15, 16 uprising from the base 5. The other end of the platform 8 is similarly disposed on rollers 17 mounted on a rod 19 fixed between the outer ends of rocking levers 20, 21, pivoted at 22, 23 on brackets 24, 25 carried by the base 5. Between the inner ends of the levers 11, 12 a rod 26 is secured, while a similar rod 27 is fixed between the inner ends of the levers 20, 21. The platform is moved upwardly by means of retractile springs 28, 29, one end of each of which is secured to a plate 30 adjustably mounted on a screw threaded post 31 fast on the base 5 and between nuts 32, 33 on the post. The other end of each of the springs 28, 29 engages a plate 34 having a centrally located hub 35 arranged to slide vertically on a straight reduced portion 36 of the post 31. The rods 26, 27 are disposed to engage the under side of the plate 34 so that any downward movement of the platform 8 will rock the levers on their respective pivots and lift the rods 26, 27 and plate 34 against the tension of the springs 28, 29, as shown in dotted outline in Fig. 14. This downward movement of the platform is limited by being brought to rest on the reduced portion 36 of the post 31, as shown in dotted outline in Fig. 5. It will be understood that, if desired, a plurality of similar posts, plates and springs may be located on the base to coact with the rods 26, 27 and platform 8.

A web 37 of paper or other similar absorbent material is arranged to extend horizontally across the top of the platform 8 from a supply roll 38 carried by a shaft 39 removably mounted in brackets 40, 41 secured to the base 5 beneath one end of the platform. This web is directed upwardly from the supply roll 38 over a horizontally arranged roller 42 carried by a shaft 43 journaled in the brackets 40, 41. A take-up roll 44 is carried by a shaft 45 removably mounted in brackets 46, 47 secured to the base 5 and disposed at the other end of the platform 8, so that the web may be passed across the platform and directed over a guide bar 48 carried by the brackets 46, 47 and thence downwardly to the take-up roll 44. The web supply and take-up rolls are disposed below the platform, while the roller 42 and guide bar 48 are positioned adjacent the opposite ends of the platform with the top of the roller and guide bar disposed in a horizontal plane above the plane of the platform, so that as the web is passed from the roller 42 to the guide bar, it will be spaced a slight distance above the upper surface of the platform when in its normal or inoperative position.

In order to conveniently remove the take-up roll when desired, I provide the side wall 2 of the cabinet with an opening which is closed with a door 49 hinged therein, while the side wall 3 has a similar opening and door 50 through which the supply roll may be removed and replaced.

Motion is imparted to the web take-up roll 44 by means of an electrically driven motor 51 which is connected to drive the take-up roll shaft 45 through a worm wheel 52 fast thereon, a worm 53 meshing with the worm wheel and secured to a shaft 54 journaled in bearings 55, 56 fixed on the base 5 and having a bevel gear 57 disposed to mesh with a bevel gear 58 fast on the shaft 59 of a speed reduction device 60, of any well-known or approved means, which is coupled to the motor shaft 61. Thus it will be seen that by the movement of the take-up roll, the web 37 will be drawn from the supply roll 38 upwardly over the roller 22, thence across the platform 8 to the bar 48 and downwardly to the take-up roll 44 to be wound thereon. In order to maintain a slight tension on the supply roll 38, I provide a bar 62 fixed between the brackets 40, 41 and having one or more spring pressed fingers 63 which contact with the surface of the web on the supply roll, as shown in Fig. 5.

Figure 5:
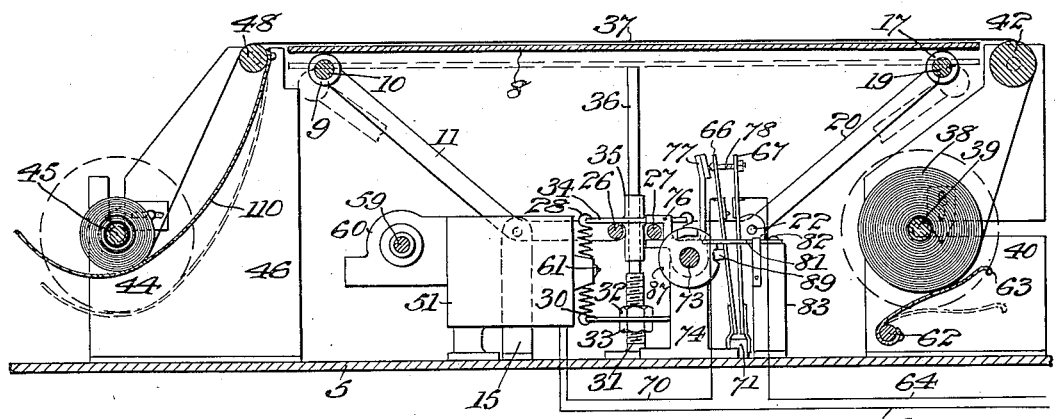
Fig. 5 represents a vertical section taken in the plane of the line V—V of Fig. 4 looking in the direction of the arrows.

The motor 51 receives its energy from the power lines 64, 65 in the usual manner, and is shown diagrammatically in Fig. 5. In order to control the actuation of the motor and thereby the movement of the web, I provide a switch for making and breaking the line 64, which switch comprises spring pressed tongues, in the present instance of insulating material, having metal contacts 68, 69 respectively. The contact 68 on the tongue 66 is connected directly to the motor 51 by a wire 70, while the contact 69 forms a terminal for the power line 64. The tongues 66, 67 are mounted on a block 71 secured to the base 5 and are designed to normally yield in one direction or toward the left, as shown in Figs. 4 to 13 inclusive, the function of which will be hereinafter explained.

The means for actuating the tongues 66, 67 is controlled by the reciprocatory movement of the platform 8, in which movement the weight of the pet presses the platform downwardly, while the upward or return movement is accomplished indirectly by the retractile springs 28, 29 and adjacent parts when the weight of the pet has been removed from the platform. The tongue actuating means comprises a member 72 loosely mounted on a shaft 73 journaled in bearings 74, 75 carried by the base 5 (see Fig. 4), one portion of which member 72 is forked at 76 to straddle the rod 27 of the rocking levers 20, 21 and be moved in one direction thereby. The other portion 77 of the member 72 is disposed to engage a projection 78 adjustably secured on the tongue 67 and extending through a hole 79 in the tongue 66 so that as the rod 27 is raised, it will rock the member 72 on its shaft 73 by the fork portion 76 and cause the portion 77 to engage the projection 78 and press the tongue 67 to the right, as shown in Figs. 8 and 9, until the head 80 of the projection 78 engages with the tongue 66, whereupon the further movement of the member will, by reason of the head engaging the tongue, move it to the right so that the tongue will be brought into a position to be engaged by a spring pressed latch 81 pivoted at 82 on a support 83 carried by the base 5. The parts above described will remain in this position as long as the weight of the pet depresses the platform.

When the pet leaves the platform, the retractile springs 28, 29 exert their pressure on the plate 34 which in turn presses the rods 26, 27 downwardly, rocking the levers 11, 12, 20 and 21 on their respective pivots and thereby lifting the platform to its normal position, as shown in Fig. 5. This downward movement actuates the member 72 in another direction from that above described so that the portion 77 of the member 72 will move to the left, while the tongue 66 is still held in its position by the latch 81. As the member 72 returns to its normal position, the spring pressed tongue 67 will also follow the portion 77 of the member 72 until the contact 69 on the tongue engages the contact 68 on the tongue 66, as shown in Figs. 10 to 13 inclusive, in which position the contacts close the circuit and energize the motor. With the motor in motion, the web 37 will, through the reduction device 60, shaft 59, bevel gears 57, 58, shaft 54, worm 53, worm wheel 52 on the take-up roll shaft 45, be drawn from the supply roll 38 upwardly over the roller 42 across the platform 8 over the bar 48 and downwardly to be wound on the take-up roll 44. The amount of web being caused to travel from the supply roll to the take-up roll is governed by its movement and frictional contact with the roller 42 which in turn actuates the shaft 73 by means of a sprocket 84 fast on the shaft 43, a chain 85 and a sprocket 86 on the shaft 73. A disc 87 is pinned on the shaft 73 to rotate therewith and is provided with a face cam 88 which is arranged to be brought into engagement with the latch 81 to release the tongue 66 therefrom. When the tongue 66 is free of the latch 81, it will still be held with the contacts closed by reason of a follower 89 fast on the tongue 66 engaging the periphery of the disc 87. The follower 89 will ride on the disc 87 until it comes into register with a notch or recess 90 in the periphery of the disc, whereupon the tongue 66 and its contact 68 will move away from the tongue 67 and its contact 69 and the circuit broken, thereby stopping the motor.

Thus, it will be understood that, when the pet enters the cabinet the platform will be depressed and the mechanism set so that upon the pet leaving the cabinet the platform will return to its normal position and the mechanism so actuated as to remove any liquid or other matter which may have been deposited on the web 37 from sight and present a clean web surface on the platform. The movement of the web will carry the soiled portion and the solid or semi-solid excretions deposited thereon to the take-up roll where the soiled web and excretions will be wound thereon.

In order that all matter either liquid or solid be directed onto and deposited within the area of the web on the platform 8, the cabinet is provided with removable partitions 91, 92, in the present instance of U-shaped formation. The partition 91 is disposed above the take-up roll and platform and comprises a front wall 93, a rear wall 94 and an end wall 95 which connects the front and rear walls. The front wall 93 is arranged to slide vertically in a channel 96 adjacent the opening 7 in the front wall 6 of the cabinet, while the rear wall 94 is disposed to slide in a vertical channel 97 carried by the back wall 4 of the cabinet. The end wall 95 rests upon a bracket 98 secured to the side wall 2 of the cabinet, while the front and rear walls are disposed in their respective channels 96, 97, by which means the partition 191 is removably held in position above the web, platform and take-up roll.

To direct the solid matter deposited on the web 37 so that it may be delivered centrally of the take-up roll 44, I provide the partition 91 with inclined columns 99, 100 connected to form a valley 101 therebetween, the lower ends of which columns and valley guide the solid matter onto the take-up roll. The columns 99, 100 also serve to satisfy the instincts of male pets. The partition 92 is also of U-shaped formation and comprises a front wall 102, a rear wall 103 and an end wall 104 which connects the front and rear walls. The front wall 102 is disposed to slide vertically in a channel 105 adjacent the opening 7 in the front wall 6 of the cabinet, while the rear wall 103 is arranged to slide in a channel 106 fixed to the back wall 4 of the cabinet. A bracket 107 is secured to the side wall 3 of the cabinet to form a rest for the end wall 104 and, together with the channels 105, 106 serve to position the partition 92 in place in the cabinet above the web and supply roll. The partition 92 is also provided with columns 108, 109 having inclined walls which project outwardly from the corners of the partition to extend over the web 37. These columns likewise serve to satisfy the instincts of male pets.

While I have shown and described the partitions 91 and 92 of U-shaped formation, I wish it to be understood that each partition may be constructed of separable wall sections to be removed as desired for cleaning purposes.

In order to collect and support any matter escaping from the take-up roll 44, I provide a yielding shield 110 having one end fixed to the bar 48, while the other end extends downwardly therefrom and is curved under the take-up roll 44, as shown in Figs. 4 and 5.

The operation of the cabinet has been described, so far as necessary, in connection with the described mechanical construction, and will not be re-stated.

It is understood that various changes may be resorted to in the form, construction and arrangement of the several parts without departing from the spirit and scope of my invention; and hence, I do not intend to be limited to the details herein shown and described except as they may be included in the claims.

What I claim is:

1. A sanitary cabinet for house pets, such as dogs, cats, or the like comprising, a housing, a platform movable therein, means for moving the platform, a cover for said platform, the dimensions of the cover and platform being such that the pet will, when in the cabinet, rest thereon and mechanism for automatically moving said cover to present a new surface on the platform, said mechanism being actuated by the movement of the platform moving means.

2. A sanitary cabinet for house pets, such as dogs, cats, or the like comprising, a housing, a platform movable therein, means for moving the platform, a cover for said platform, the dimensions of the cover and platform being such that the pet will, when in the cabinet, rest thereon and mechanism for automatically moving said cover to present a new surface on the platform, said mechanism being actuated by the movement in one direction of the platform moving means.

3. A sanitary cabinet for house pets, such as dogs, cats, or the like comprising, a housing, a platform reciprocable therein, means for moving the platform, a cover for said platform, the dimensions of the cover and platform being such that the pet will, when in the cabinet, rest thereon and mechanism for automatically moving said cover to present a new surface on the platform, said mechanism being actuated by the movement of the platform moving means.

4. A sanitary cabinet for house pets, such as dogs, cats, or the like comprising, a housing, a platform reciprocable therein, means for moving the platform, a cover for said platform, the dimensions of the cover and platform being such that the pet will, when in the cabinet, rest thereon and mechanism for automatically moving said cover to present a new surface on the platform, said mechanism being actuated by the movement in one direction of the platform moving means.

5. A sanitary cabinet for house pets, such as dogs, cats, or the like comprising, a housing, a platform vertically reciprocable therein, means for moving the platform, a cover for said platform, the dimensions of the cover and platform being such that the pet will, when in the cabinet, rest thereon and mechanism for automatically moving said cover to present a new surface on the platform, said mechanism being actuated by the movement of the platform moving means.

6. A sanitary cabinet for house pets, such as dogs, cats, or the like comprising, a housing, a platform vertically reciprocable therein, means for moving the platform, a cover for said platform, the dimensions of the cover and platform being such that the pet will, when in the cabinet, rest thereon and mechanism for automatically moving said cover to present a new surface on the platform, said mechanism being actuated by the movement in one direction of the platform moving means.

7. A sanitary cabinet for house pets, such as dogs, cats, or the like comprising, a housing, a platform vertically reciprocable therein, means for moving the platform, a cover for said platform, the dimensions of the cover and platform being such that the pet will, when in the cabinet, rest thereon and mechanism for automatically moving said cover to present a new surface on the platform, said mechanism being actuated by the upward movement of the platform moving means.

8. A sanitary cabinet for house pets, such as dogs, cats, or the like comprising, a housing, a platform movable therein, means for moving the platform, a web of absorbent material disposed to cover and protect said platform, the dimensions of the web cover and platform being such that the pet will, when in the cabinet, rest thereon and mechanism for automatically moving said web to present a new surface of web on the platform, said mechanism being actuated by the movement of the platform moving means.

9. A sanitary cabinet for house pets, such as dogs, cats, or the like comprising, a housing, a platform movable therein, means for moving the platform, a web of absorbent material disposed to cover and protect said platform, the dimensions of the web cover and platform being such that the pet will, when in the cabinet, rest thereon and mechanism for automatically moving said web to present a new surface of web on the platform, said mechanism being actuated by the movement in one direction of the platform moving means.

10. A sanitary cabinet for house pets, such as dogs, cats, or the like comprising, a housing, a platform reciprocable therein, means for moving the platform, a web of absorbent material disposed to cover and protect said platform, the dimensions of the web cover and platform being such that the pet will, when in the cabinet, rest thereon and mechanism for automatically moving said web to present a new surface of web on the platform, said mechanism being actuated by the movement of the platform moving means.

11. A sanitary cabinet for house pets, such as dogs, cats, or the like comprising, a housing, a platform reciprocable therein, means for moving the platform, a web of absorbent material disposed to cover and protect said platform, the dimensions of the web cover and platform being such that the pet will, when in the cabinet, rest thereon and mechanism for automatically moving said web to present a new surface of web on the platform, said mechanism being actuated by the movement in one direction of the platform moving means.

12. A sanitary cabinet for house pets, such as dogs, cats, or the like comprising, a housing, a platform vertically reciprocable therein, means for moving the platform, a web of absorbent material disposed to cover and protect said platform, the dimensions of the web cover and platform being such that the pet will, when in the cabinet, rest thereon and mechanism for automatically moving said web to present a new surface of web on the platform, said mechanism being actuated by the movement of the platform moving means.

13. A sanitary cabinet for house pets, such as dogs, cats, or the like comprising, a housing, a platform vertically reciprocable therein, means for moving the platform, a web of absorbent material disposed to cover and protect said platform, the dimensions of the web cover and platform being such that the pet will, when in the cabinet, rest thereon and mechanism for automatically moving said web to present a new surface of web on the platform, said mechanism being actuated by the movement in one direction of the platform moving means.

14. A sanitary cabinet for house pets, such as dogs, cats, or the like comprising, a housing, a platform vertically reciprocable therein, means for moving the platform, a web of absorbent material disposed to cover and protect said platform, the dimensions of the web cover and platform being such that the pet will, when in the cabinet, rest thereon and mechanism for automatically moving said web to present a new surface of web on the platform, said mechanism being actuated by the upward movement of the platform moving means.

15. A sanitary cabinet for house pets, such as dogs, cats, or the like comprising, a housing, a platform therein, a web of absorbent material disposed to cover and protect said platform, supply and take-up rolls for said web, and cooperating mechanism placed in operative position by the pet resting on the web and platform and automatically moving said supply and take-up rolls to present a new surface of web on the platform when the pet leaves the housing.

16. A sanitary cabinet for house pets, such as dogs, cats, or the like comprising, a housing, a platform movable therein, means for moving the platform, a web of absorbent material disposed to cover and protect said platform, supply and take-up rolls for said web, and mechanism for automatically moving said supply and take-up rolls to present a new surface of web on the platform, said mechanism being actuated by the movement of the platform moving means.

17. A sanitary cabinet for house pets, such as dogs, cats, or the like comprising, a housing, a platform movable therein, means for moving the platform, a web of absorbent material disposed to cover and protect said platform, supply and take-up rolls for said web, and mechanism for automatically moving said supply and take-up rolls to present a new surface of web on the platform, said mechanism being actuated by the movement in one direction of the platform moving means.

18. A sanitary cabinet for house pets, such as dogs, cats, or the like comprising, a housing, a platform reciprocable therein, means for moving the platform, a web of absorbent material disposed to cover and protect said platform, supply and take-up rolls for said web, and mechanism for automatically moving said supply and take-up rolls to present a new surface of web on the platform, said mechanism being actuated by the movement of the platform moving means.

19. A sanitary cabinet for house pets, such as dogs, cats, or the like comprising, a housing, a platform reciprocable therein, means for moving the platform, a web of absorbent material disposed to cover and protect said platform, supply and take-up rolls for said web, and mechanism for automatically moving said supply and take-up rolls to present a new surface of web on the platform, said mechanism being actuated by the movement in one direction of the platform moving means.

20. A sanitary cabinet for house pets, such as dogs, cats, or the like comprising, a housing, a platform vertically reciprocable therein, means for moving the platform, a web of absorbent material disposed to cover and protect said platform, supply and take-up rolls for said web, and mechanism for automatically moving said supply and take-up rolls to present a new surface of web on the platform, said mechanism being actuated by the movement of the platform moving means.

21. A sanitary cabinet for house pets, such as dogs, cats, or the like comprising, a housing, a platform vertically reciprocable therein, means for moving the platform, a web of absorbent materials disposed to cover and protect said platform, supply and take-up rolls for said web, and mechanism for automatically moving said supply and take-up rolls to present a new surface of web on the platform, said mechanism being actuated by the movement in one direction of the platform moving means.

22. A sanitary cabinet for house pets, such as dogs, cats, or the like comprising, a housing, a platform vertically reciprocable therein, means for moving the platform, a web of absorbent material disposed to cover and protect said platform, supply and take-up rolls for said web, and mechanism for automatically moving said supply and take-up rolls to present a new surface of web on the platform, said mechanism being actuated by the upward movement of the platform moving means.

23. A sanitary cabinet for house pets, such as dogs, cats, or the like comprising, a walled housing open on one side, a platform therein, an absorbent cover for said platform, and means forming a part of the vertical end walls of said housing for directing the matter discharged thereagainst onto the absorbent cover on the platform.

24. A sanitary cabinet for house pets, such as dogs, cats, or the like comprising, a walled housing open on one side, a platform therein, an absorbent cover for said platform, and means forming a part of the vertical end walls of said housing for directing the matter discharged thereagainst onto the absorbent cover on the platform, said means being removably mounted in the housing.

25. A sanitary cabinet for house pets, such as dogs, cats or the like comprising, a housing, a platform therein, a cover for said platform, and cooperating mechanism placed in operative position by the pet resting on the cover and platform and automatically moving said cover to present a new surface on the platform when the pet leaves the housing.

26. A sanitary cabinet for house pets, such as dogs, cats or the like comprising, a housing, a platform therein, a web of absorbent material disposed to cover and protect said platform, and cooperating mechanism placed in operative position by the pet resting on the web and platform and automatically moving said web to present a new surface of web on the platform when the pet leaves the housing.

WILLIAM B. EBELING.